United States Patent [19]

Provost et al.

[11] 4,067,045
[45] Jan. 3, 1978

[54] LOW LIGHT LEVEL CAMERA WITH PARALLEL-CONNECTED SLIDABLY MOUNTED INTENSIFIER ASSEMBLIES

[75] Inventors: John K. Provost, Babylon; Charles Lien, Huntington, both of N.Y.

[73] Assignee: Venus Scientific Inc., Farmingdale, N.Y.

[21] Appl. No.: 727,527

[22] Filed: Sept. 28, 1976

[51] Int. Cl.² .............................................. H04N 5/30
[52] U.S. Cl. ............................ 358/211; 250/213 VT; 358/229
[58] Field of Search .............................. 358/211, 229; 250/213 VT

[56] References Cited

U.S. PATENT DOCUMENTS

| 3,553,363 | 1/1971 | Anderson | 358/211 |
| 3,805,058 | 4/1974 | Glaenzer | 250/213 VT X |
| 3,848,123 | 11/1974 | Parker et al. | 250/213 VT |
| 3,974,331 | 8/1976 | Pepin | 250/213 VT X |

Primary Examiner—Richard Murray
Assistant Examiner—Mitchell Saffian
Attorney, Agent, or Firm—Ostrolenk, Faber, Gerb & Soffen

[57] ABSTRACT

A low light level camera includes a plurality of identical modular-type intensifier assemblies which are removably clamped together, and are connected in electrical parallel with one another. The intensifier assembly is axially movable with respect to the camera frame and lens for focus adjustment.

7 Claims, 15 Drawing Figures

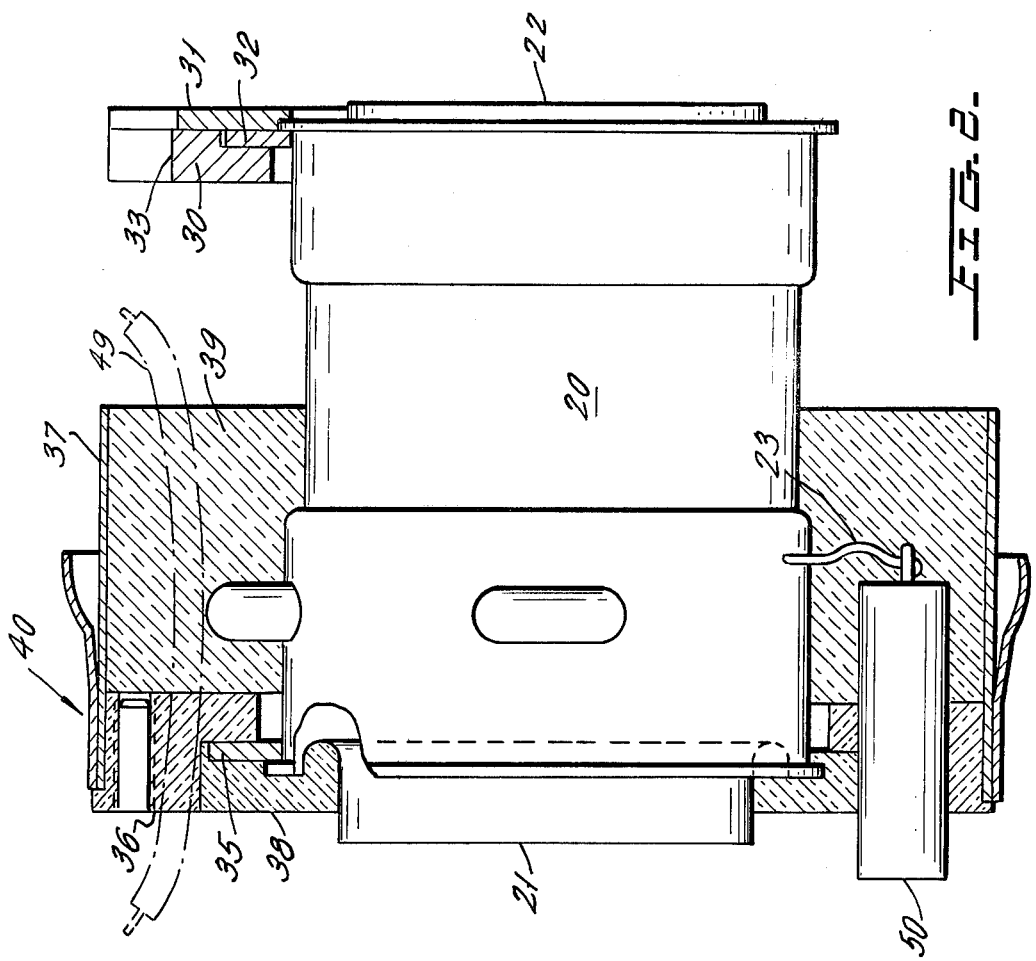
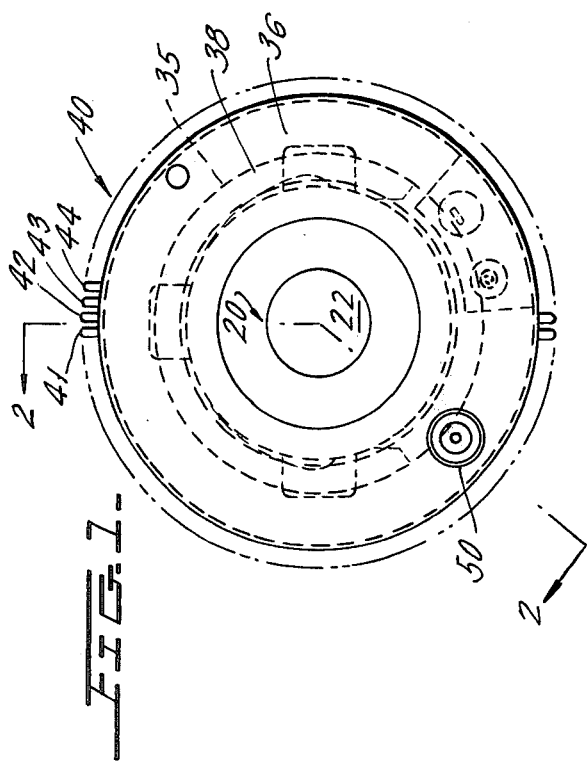
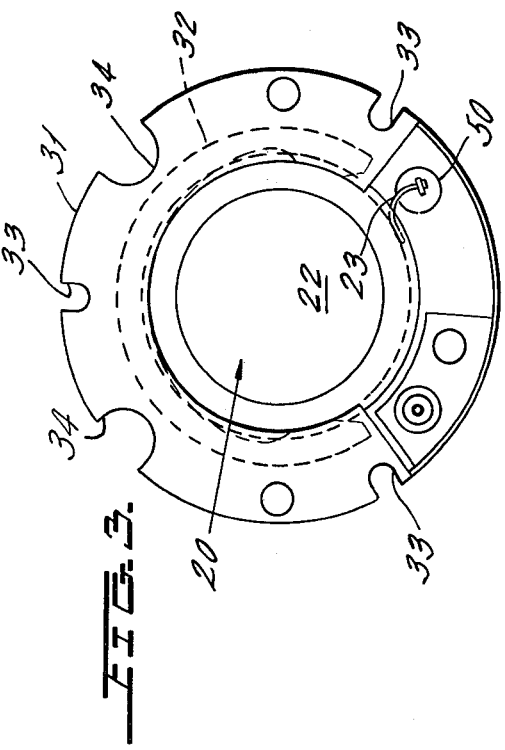

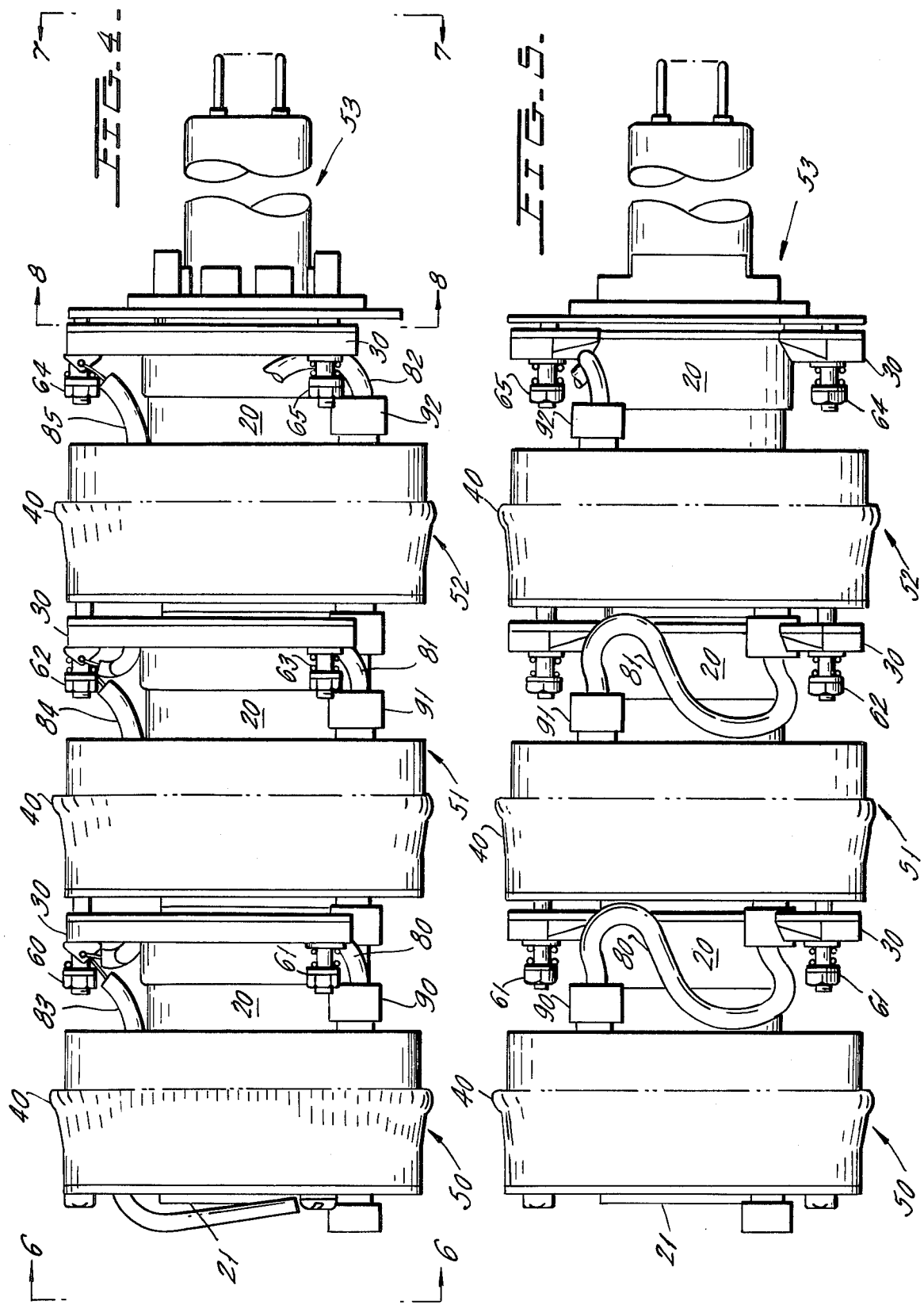

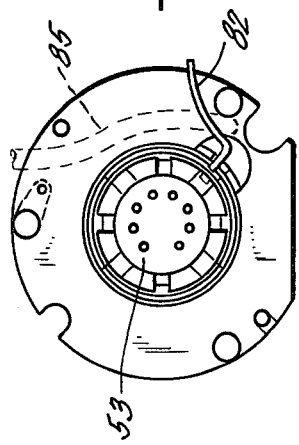
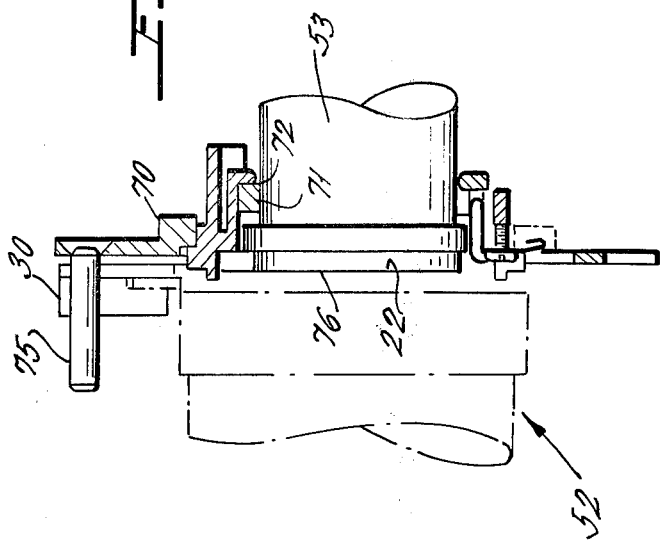
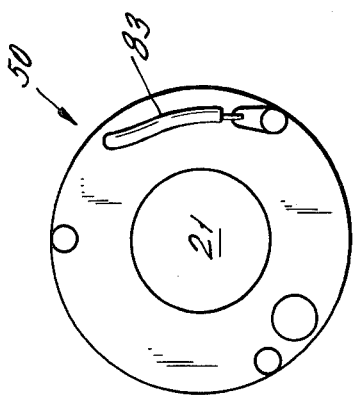
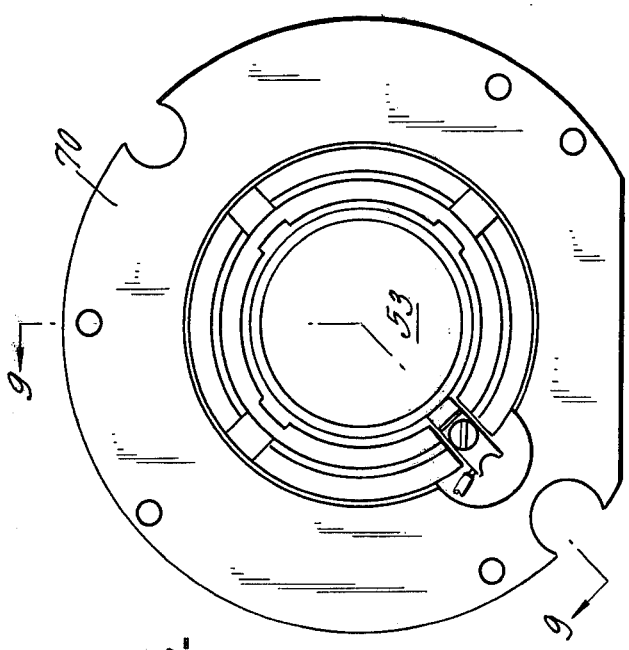

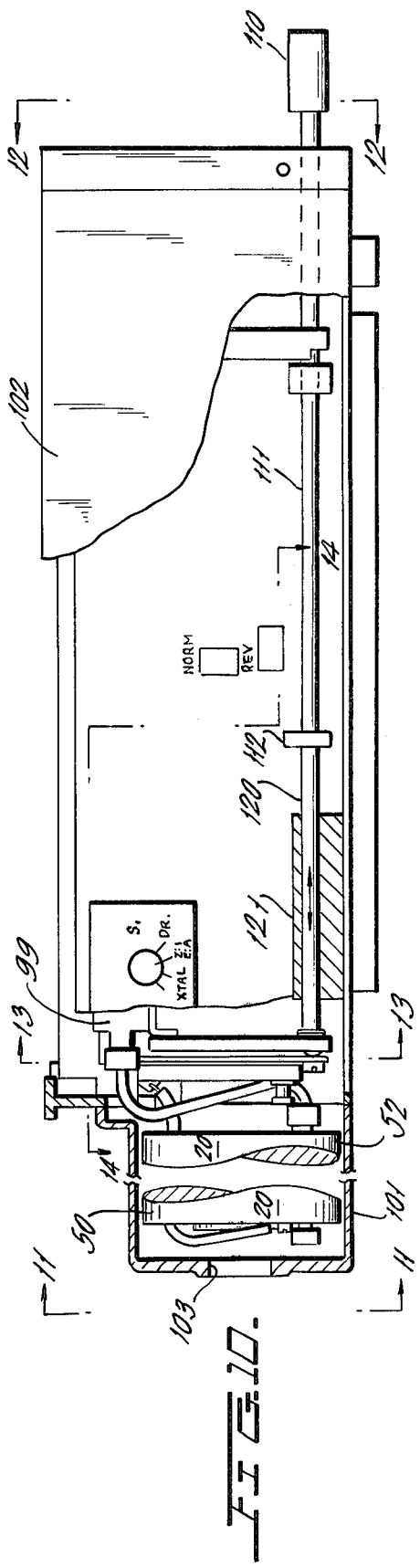
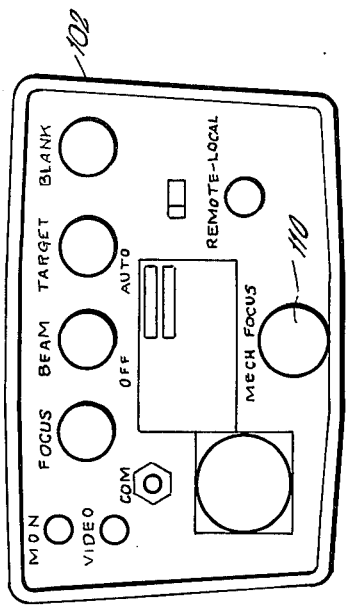
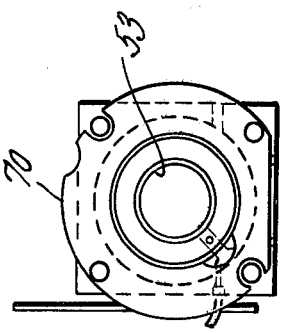
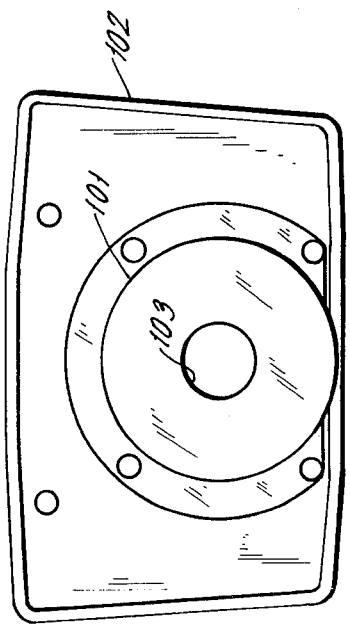

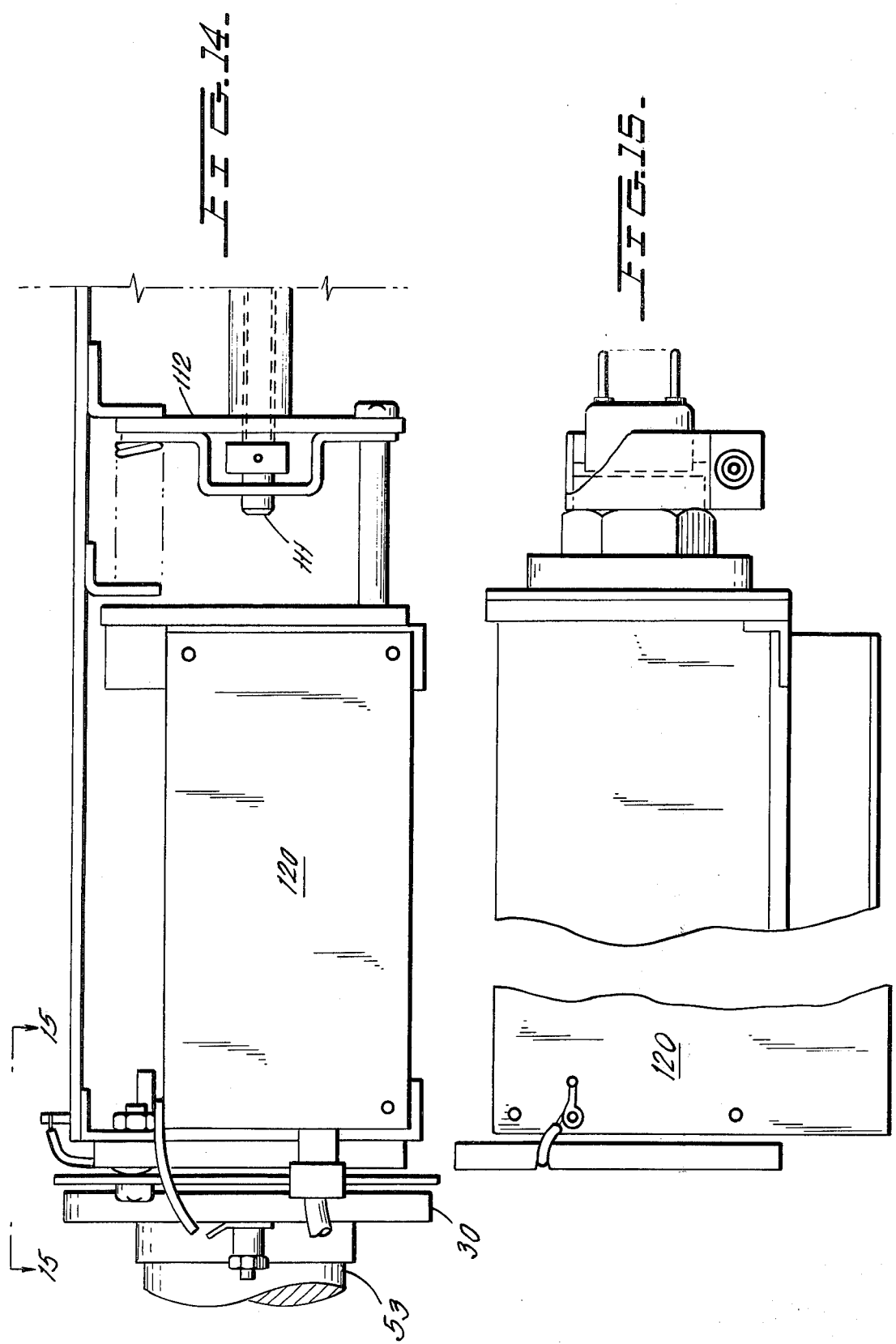

LOW LIGHT LEVEL CAMERA WITH PARALLEL-CONNECTED SLIDABLY MOUNTED INTENSIFIER ASSEMBLIES

BACKGROUND OF THE INVENTION

This invention relates to low light level cameras, and more specifically relates to a novel camera having a plurality of axially movable intensifier assemblies which are connected in parallel with a common high voltage power supply.

Low light level cameras are well known in the art wherein a plurality of image intensifiers are connected in series with one another and to a vidicon-type tube. In such arrangements, the intensifier terminals are connected in series with one another and in series with a power supply which has an output voltage equal to the sum of the voltages required for each intensifier. Thus, if there is an assembly of three image intensifiers which each require 10,000 volts for their operation, the power supply would provide 30,000 volts in series with the intensifier assembly. The complete intensifier assembly is then potted in a common insulation medium, and then fixed to a frame. Focal adjustment for the camera is obtained by axially moving the lens in front of the intensifier assembly.

The above prior art arrangement requires a relatively high voltage power supply with attendant insulation problems, and requires focal adjustment from the lens side of the camera. Moreover, it is difficult to repair the unit since the individual intensifiers are potted together and a single, defective intensifier cannot be replaced without decapsulating the entire assembly.

BRIEF DESCRIPTION OF THE INVENTION

In accordance with the invention, the individual intensifier terminals are connected in parallel with one another and with a power supply which has an output, for example, of 10,000 volts which is the required input voltage for any one of the intensifiers. Moreover, each intensifier is made as a modular unit, removably connected to an adjacent intensifier, and slidably mounted within the camera support frame. A focus adjustment knob is then connected to the intensifier vidicon assembly and is operable from the camera control panel, to move the intensifiers and vidicon connected thereto relative to a fixed lens. Thus, in the novel camera of the invention, a relatively low voltage supply may be used, thus reducing insulation problems; the intensifiers are axially movable from the camera control panel for focus adjustment, and individual intensifiers can be readily removed and replaced from the assembly. Moreover, the individual intensifiers are slidably connected to the grounded support frame through a flexible spring sleeve which reduces shock forces which can be applied through the frame to the intensifiers.

BRIEF DESCRIPTION OF THE DRAWINGS

FIG. 1 is a front view of an image intensifier assembly of the invention as prepared for assembly in the camera of the invention.

FIG. 2 is a cross-sectional view of FIG. 1 taken across section line 2—2 in FIG. 1.

FIG. 3 is a rear view of the intensifier assembly of FIG. 1.

FIG. 4 is a side plan view of an assembly of three intensifiers of the type shown in FIGS. 1 to 3 and a vidicon tube.

FIG. 5 is a side view of FIG. 4.

FIG. 6 is a view of the left-hand end of FIG. 4 as seen from arrows 6—6 in FIG. 4.

FIG. 7 is a view of the right-hand end of FIG. 4 as seen from the arrows 7—7 in FIG. 4.

FIG. 8 is a cross-sectional view of FIG. 4 taken across the section line 8—8 in FIG. 4.

FIG. 9 is a cross-sectional view of FIG. 8 taken across section line 9—9 in FIG. 8, and particularly illustrates the connection between the image intensifier assembly and vidicon.

FIG. 10 is a partial broken-away side view of the housing and support frame with image intensifier assemblies in place.

FIG. 11 is a view of the left-hand end of FIG. 10, as seen from arrows 11—11 in FIG. 10.

FIG. 12 is a view of the right-hand end of FIG. 10, as seen from arrows 12—12 in FIG. 10.

FIG. 13 is a cross-sectional view of FIG. 10 taken across section line 13—13 in FIG. 10.

FIG. 14 is a cross-sectional view of FIG. 10 taken across section line 14—14 in FIG. 10.

FIG. 15 is a view of FIG. 14 taken across section line 15—15 in FIG. 14.

DETAILED DESCRIPTION OF THE DRAWINGS

Referring first to FIGS. 1, 2 and 3, there is shown a commercially available intensifier 20 which has fibre-optic input and output surfaces 21 and 22, to which a lead 23 (FIGS. 2 and 3) is attached.

The intensifier 20 is operated by applying a suitable voltage, for example, 10,000 volts, between lead 23 of the intensifier and clamp rings 30-33. Clamp rings 30 and 31 are mounting rings which are suitably connected to one another, capturing a C ring 32. Clamps 30 and 31 have suitable notches, such as notches 33 and 34 (FIGS. 2 and 3) to enable removable connection to an adjacent intensifier assembly or vidicon, as will be later described.

The left-hand end of intensifier 20 then receives a C ring 35 (FIGS. 1 and 2) which supports a clamp ring 36 as shown. Clamp ring 36 then has a conductive cylinder 37 (FIG. 2) secured thereto which extends rearwardly, as shown. The regions 38 and 39 within clamp 36 and within cylinder 37, respectively, are potted with a suitable insulation material, such as RTV (FIGS. 1 and 2).

A flexible conductive sleeve 40 consisting of separate spring fingers, such as individual spring fingers 41 to 44, shown in FIG. 1, is then secured to the conductive cylinder 37 and the sleeve 40 of conductive fingers will then serve, as will be later seen, as the flexible support for supporting the intensifier assembly shown in FIGS. 1, 2 and 3 within its support frame. The intensifier assembly of FIGS. 1, 2 and 3 further includes a connector member 50 which enables easy connection and disconnection of the high-voltage lead 23 to adjacent intensifier assemblies.

A ground return wire 49 is provided for ground interconnection of clamp members 30-33 and the ground return lead of the high voltage power supply (not shown).

Referring next to FIGS. 4 and 5, there is illustrated therein three intensifier assemblies 50, 51 and 52, each of which are identical in construction to the intensifier assembly shown in FIGS. 1, 2 and 3. FIGS. 4 and 5 also show a vidicon tube 53 which has its input surface coupled to and clamped to the output surface of intensifier assembly 52. The intensifier assembly 52 is, in turn, clamped to intensifier 51 which is, in turn, clamped to intensifier 50. The intensifiers are clamped to one another through a suitable spring-biased bolt connection which enables the connection of the clamp 36 (FIG. 2) of one intensifier assembly to the clamp 30 of the adjacent intensifier assembly. These spring-biased bolt connections are illustrated in FIGS. 4 and 5 as spring-biased bolting assemblies 60–61, 62–63 and 64–65 for assemblies 50, 51 and 52, respectively.

The clamps 64 and 65 are adapted to make connection to the vidicon tube 53 in the manner best shown in FIG. 9. Thus, in FIG. 9, the vidicon tube assembly 53 has a vidicon/yoke mounting plate 70 affixed thereto, which is in turn connected to a vidicon ring 71, which is connected to the vidicon tube itself by an epoxy material, such as the epoxy bead 72. This clamping arrangement then allows the spring connector members 64 and 65 to connect to suitable extensions, such as the extension 75 in FIG. 9, in order to clamp the surface 22 of intensifier assembly 52 to the surface 76 of the vidicon tube 53. Note that, in the clamping arrangement described above, the vidicon and all intensifier assemblies are clamped into a single unit, but that any of the elements are removably connected to the others by the spring-actuated clamping construction to enable the removal and replacement of any of the subassemblies.

FIGS. 4 and 5 further illustrate connecting leads for enabling the connection of the individual intensifier assemblies 50 to 52 in parallel with one another and with a power supply. These leads include high-voltage leads 80, 81, 82 and ground leads 83, 84 and 85. Note that the high-voltage leads are connected to fast disconnect terminals, such as disconnect terminals 90, 91 and 92, so that the leads can be easily disconnected between intensifier assemblies if a particular assembly is to be removed and replaced.

Lead 82 is then connected to the high-voltage supply output terminal, and ground lead 85 is connected to the high-voltage power supply return. Note that the high-voltage power supply is partly shown in FIG. 10 as component 99.

FIGS. 10 to 15 show the camera housing for receiving the intensifier assembly and vidicon of FIGS. 4 and 5. Referring first to FIGS. 10 and 11, the camera housing comprises a tubular conductive extension 101 which is bolted to the main housing 102 (FIGS. 10, 11 and 12). The conductive tube 101 has an opening 103 which cooperates with a camera lens (not shown), and slidably receives the intensifier assemblies 50, 51 and 52 of FIGS. 4 and 5. The spring finger sleeves 40 of intensifier assemblies are slidably received within and are electrically connected to the interior of tube 101. The vidicon 53 which is secured to intensifier assemblies 50 to 52 extends rearwardly into housing portion 102 (FIGS. 13 and 14) and is axially movable therein.

The right-hand end of housing 102 contains the camera operating controls, as shown in FIG. 12, and the camera control electronics are contained within housing 102. One of the controls available at the control panel is the mechanical focus knob 110 (FIGS. 10 and 12) which permits the focusing of the camera from the rear of the camera.

Knob 110 is connected to a rotatable threaded shaft 111 which is threadably received by a stationary bushing and extends to an axially movable pad 112. Pad 112 is connected to slide member 120, which is, in turn, connected to the axially movable assembly of FIGS. 4 and 5. Slide member 120 slides within suitable fixed guide member 121 (FIG. 10).

In order to adjust the focus of the camera, the operator can now make the adjustment by rotating knob 110 of FIGS. 10 and 12. This causes the axial motion of shaft 111 and slide 120, and the axial movement of the entire assembly of FIGS. 4 and 5 relative to the lens at the end of tube 101 (FIG. 10).

Although a preferred embodiment of this invention has been described, many variations and modifications will now be apparent to those skilled in the art, and it is therefore preferred that the instant invention be limited not by the specific disclosure herein but only by the appended claims.

The embodiments of the invention in which an exclusive privilege or property is claimed are defined as follows:

1. A low level light camera comprising, in combination:
   a support frame;
   a plurality of identical image intensifier assemblies each having a pair of high-voltage terminals;
   a vidicon tube optically coupled to and axially aligned with said image intensifier assemblies;
   a high-voltage power supply having an output voltage substantially equal to the required voltage for operating any one of said image intensifier assemblies;
   connecting means connecting said plurality of identical image intensifier assemblies and said vidicon tube to said support frame;
   and means connecting each of said pair of high-voltage terminals in parallel with one another and to said output voltage of said high-voltage power supply.

2. The camera of claim 1 which includes removable connecting means for removably connecting said image intensifier assemblies to one another, whereby any one of said image intensifier assemblies can be removed from said support frame and replaced by a replacement assembly.

3. The camera of claim 1 wherein said connecting means permits axial movement of said image intensifier assemblies, and which further includes an adjustment shaft connected to said image intensifier assemblies operable to move said assemblies axially relative to said frame to affect focus adjustment.

4. The camera of claim 3 which further includes vidicon circuit means for operating said vidicon tube and a control panel containing controls connected to said vidicon circuit means; said adjustment shaft extending to and being operable from said control panel.

5. The camera of claim 3 wherein said connecting means includes a grounded sleeve of flexible spring fingers for each of said assemblies.

6. The camera of claim 3 which includes removable connecting means for removably connecting said image intensifier assemblies to one another, whereby any one of said image intensifier assemblies can be removed from said support frame and replaced by a replacement assembly.

7. The camera of claim 6 which further includes vidicon circuit means for operating said vidicon tube and a control panel containing controls connected to said vidicon circuit means; said adjustment shaft being operable from said control panel.

* * * * *